May 17, 1960 R. A. WITTREN 2,936,649
CONTROL MECHANISM
Filed March 31, 1958 3 Sheets-Sheet 1

INVENTOR.
R. A. WITTREN

May 17, 1960 R. A. WITTREN 2,936,649
CONTROL MECHANISM
Filed March 31, 1958 3 Sheets-Sheet 2

INVENTOR.
R. A. WITTREN

May 17, 1960  R. A. WITTREN  2,936,649
CONTROL MECHANISM

Filed March 31, 1958  3 Sheets-Sheet 3

INVENTOR.
R. A. WITTREN

United States Patent Office 2,936,649
Patented May 17, 1960

2,936,649
CONTROL MECHANISM

Richard A. Wittren, Cedar Falls, Iowa, assignor, by mesne assignments, to Deere & Company, a corporation of Delaware Application March 31, 1958, Serial No. 725,129

11 Claims. (Cl. 74—473)

This invention relates to a control mechanism and more particularly to the control of a vehicle transmission.

The invention finds particular utility in a multi-speed dual-range transmission, one example of which forms the subject matter of the U.S. patent to Du Shane 2,710,546, wherein is disclosed a transmission having a range section, capable of affording high and low forward ranges and one reverse range, and a speed section capacitated to produce several speeds, the number of which can be doubled in a forward direction and which can be used without doubling in the reverse direction. Although transmissions of this general character are known, there are certain aspects in the control thereof that present problems, such as control, sequence of speeds, etc.

It is primarily a requisite that the transmission be controlled by a single control lever so that one manual movement will select not only a speed ratio but also a range ratio, whether this be forwardly or in reverse. The same considerations are applicable to different types of control, such as the so-called push-button type, with which the present invention is especially concerned.

It is therefore a significant object of the invention to afford a novel selector control involving a selector for each section of the transmission, together with means whereby the selectors may be moved in such manner as to select any desired speed and range ratio. This arrangement features the provision of a system wherein a single push-button, when depressed, will select the desired transmission drive. Other objects of the invention reside in a design including a plurality of keys or operators cooperative with a plurality of selectors and all arranged in unitary compact fashion so that they may be readily incorporated in the instrument panel of a vehicle; a novel biasing means arrangement in which the biasing effect is cancelled when any one key is depressed, whereby that key remains down as an indication of the status of the transmission drive; and such other objects and features, inherent in and encompassed by the invention as will become apparent on the basis of the following disclosure of the preferred embodiment of the invention, by way of example, as described in the ensuing specification and accompanying sheets of drawings, the several figures of which are described below.

Figure 1:
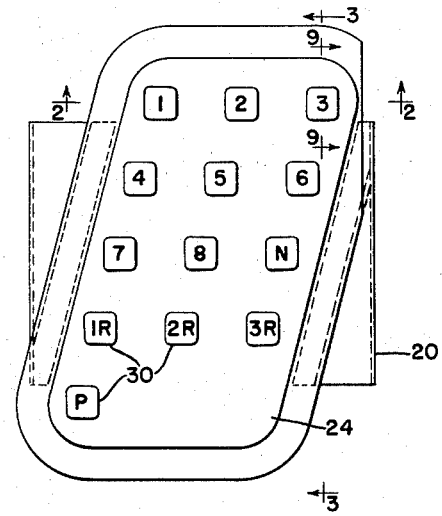
Figure 2:
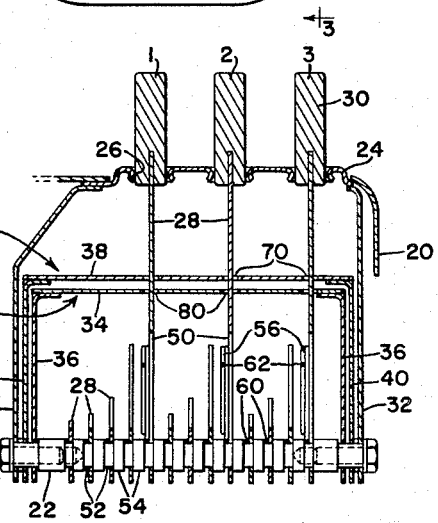
Figure 9:
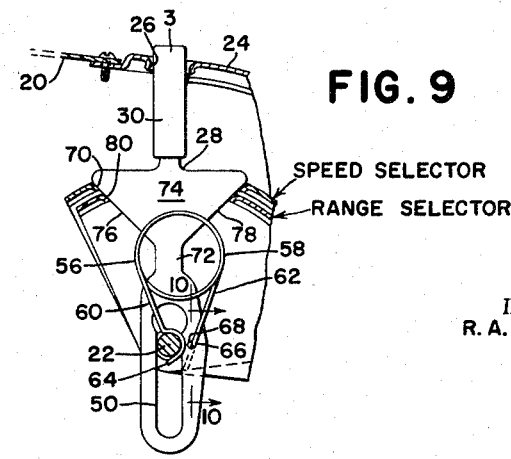
Figure 4:
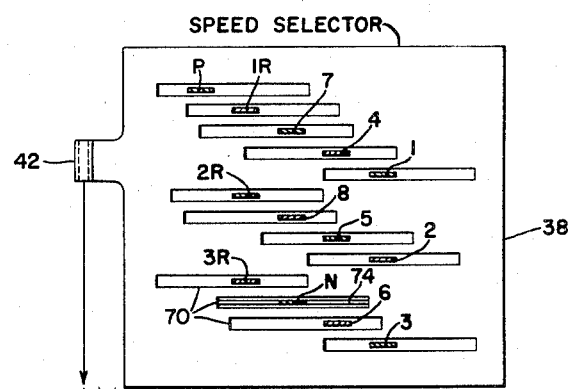
Figure 5:
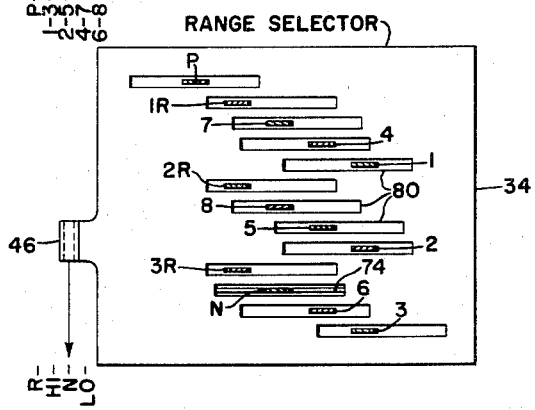
Figure 3:
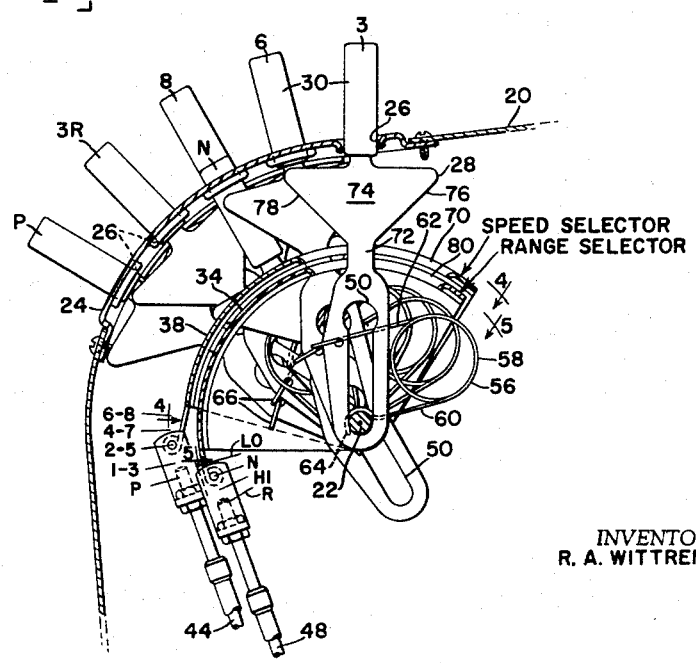
Figure 7:
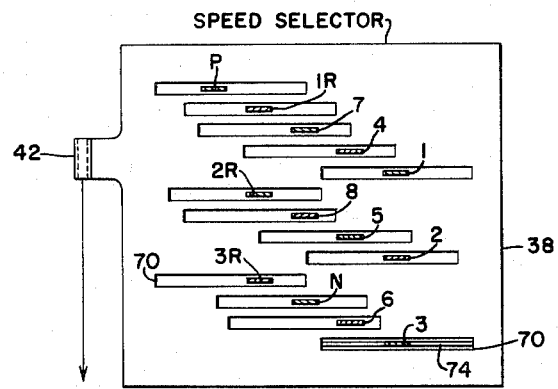
Figure 8:
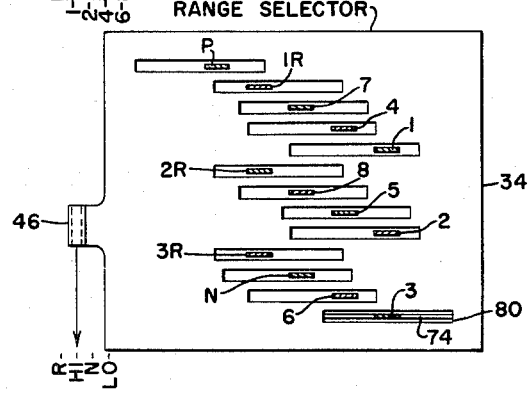
Figure 6:
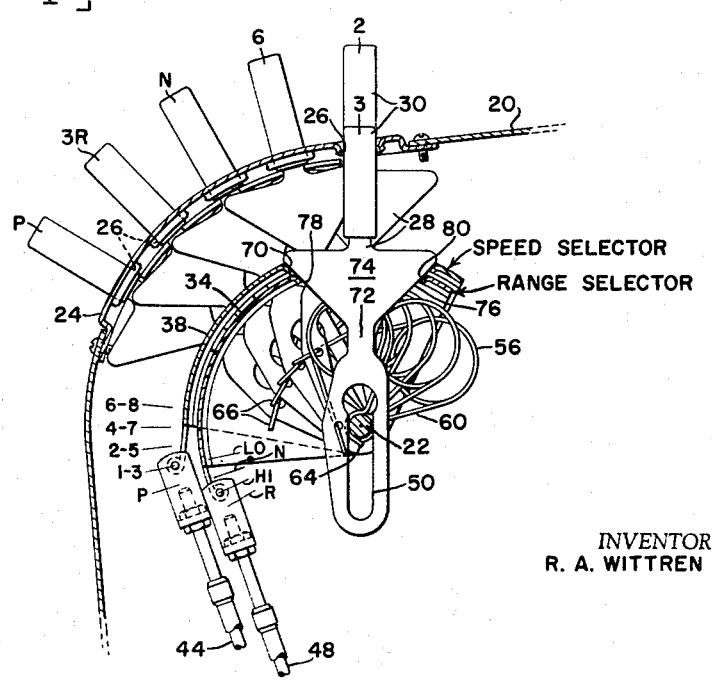

Fig. 1 is a plan of the control mechanism.
Fig. 2 is a section on the line 2—2 of Fig. 1.
Fig. 3 is a section on the line 3—3 of Fig. 1.
Fig. 4 is a "developed" view, partly in section, as seen along the line 4—4 of Fig. 3.
Fig. 5 is a similar view as seen along the line 5—5 of Fig. 3.
Fig. 6 is a view similar to Fig. 3 but showing the selection of a different speed in the transmission.
Fig. 7 is similar to Fig. 4 but is based on Fig. 6.
Fig. 8 is similar to Fig. 5 but is based on Fig. 6.
Fig. 9 is a fragmentary section as seen generally along the line 9—9 of Fig. 1.

Figure 10:
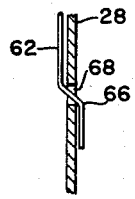

Fig. 10 is an enlarged fragmentary section as seen along the line 10—10 of Fig. 9.

In the interests of clarification, certain of the parts are identified by descriptive legends rather than reference numerals, which applies particularly to the "speed selector" and "range selector." Considering the invention as applied to a transmission of the type disclosed in the above identified Du Shane patent, the speed selector is instrumental in selecting the several speeds in the speed section of the transmission; and the range selector is effective on the range section. Although the control mechanism disclosed here is primarily adapted for use with intervening servo means, such as hydraulic or electrical actuators, it will be clear that the selectors can be directly and mechanically connected to the shiftable parts of the transmission, provided that a sufficient mechanical advantage is obtained. In any event, the type of connection intervening between the control mechanism and the transmission, and the specific type of transmission itself, are not limitations on the scope of the invention.

In view of the adaptability of the control mechanism to a vehicle transmission and the desirability of locating the control mechanism as a unit on the instrument panel or the like, the description will proceed in terms of the relationship of the unit to the front and rear of the vehicle. For example, in Fig. 1, the forward direction is at the top of the sheet. Fig. 2 is seen from a position behind the unit and looking forwardly. In Figs. 3 through 8, the front of the vehicle is at the right hand side of the sheet. Fig. 9 is a reversal of a portion of Fig. 6 and consequently the front of the vehicle is at the left of the sheet.

The unit itself or some part of the vehicle on which the unit is mounted may include or afford a support, here indicated in its entirety by the numeral 20. This support includes a transverse horizontal shaft 22 and an arcuate panel 24 outwardly of and concentric with the shaft. The panel is provided with a plurality of axially and circumferentially spaced guide apertures, as at 26. In the present instance, there are 13 apertures, one for each of a plurality of operators or keys 28, of which there are also 13, because the specific transmission environment includes eight speeds forward, three speeds in reverse, a neutral position and a park position. Since the keys are here shown as being identical, only one will be described, it being understood that the characteristics of one are applicable to all. Each key is provided at its upper end with an elongated part 30 which serves as a push button capable of being operated with one finger. As shown in Fig. 1, each button is identified by the numeral or combination of numeral and letter according to the speed or status that it will produce in the transmission. This manner of identification has been carried out in Figs. 2 through 9. In Figs. 4, 5, 7 and 8, the keys are identified not by the numeral 28 but by the push-button identification thereof. This will facilitate the description and an understanding of the invention.

The shaft 22 is appropriately fixed at each of its opposite ends in depending portions 32 of the support 20 and thereby serves not only as means for supporting the lower ends of the keys 28 but also as means for carrying the range and speed selectors for independent fore-and-aft rocking about the axis of the shaft. By way of brief description, the range selector includes a fore-and-aft arcuate part 34 of substantial width and a pair of depending legs 36 which are pivotally mounted at their lower ends on the shaft 22. The speed selector likewise includes a fore-and-aft arcuate part 38 and depending legs 40 carried at their lower ends on the shaft 22. The arcuate parts 34 and 38 of the range and speed selectors, respectively, are concentric about the axis of the shaft 22, as is the panel 24, as previously described.

Rockability of the speed and range selectors about the shaft 22 is utilized to transmit force to the transmission, either directly or through the intermediary of hydraulic valves, for example, as already indicated. The connection of the speed selector to the transmission is effected at 42 to a sheathed cable 44, for example, and a similar connection at 46 to a second sheathed cable 48 is made to the range selector. In Figs. 4, 5, 7 and 8, the center lines of the connections 42 and 46 are utilized as indices of the respective positions of the selectors. For example, as seen in Fig. 4, the speed selector has 5 ultimate positions, and as indicated by the arrow it is in the 2-5 position. The range selector has 4 ultimate positions, and as indicated by its arrow it is in neutral.

In explanation of such positions as 1-3, 2-5, 4-7 and 6-8, it must be recognized that the speed section of the transmission is capable of producing four basic speeds. This number of speeds may be doubled by the high-low part of the transmission range section. In the arrangement shown, when the speed selector selects the 2-5 position, it remains for the range selector to choose between the lower and higher of the two. For example, in low, the transmission operates in first speed and in high it operates in third speed. The same applies as to the choice between second and fifth, fourth and seventh and sixth and eighth. Also, the transmission is capable of producing at least four speeds in reverse, based on the basic four speeds in the transmission speed section. In the present instance, fourth speed in reverse is not used. Hence, the three reverse speeds, designated 1R, 2R and 3R in Fig. 1, as well as in the other figures, are based on the speeds produced in the 1-3, 2-5 and 4-7 phases. The park position may be produced by shifting the transmission simultaneously into two inconsistent speeds, which must be done, of course, with the vehicle at rest. The particular manner in which the park position is obtained is immaterial here.

As previously described, each key 28 is guided via its push-button portion 30 in the associated panel guide aperture 26. This is part of the means for guiding each key along a straight-line path radial to the shaft 22. The other part of the means comprises a keyhole slot 50. This slot is elongated lengthwise of the key and therefore lies along the path to which movement of the key is confined. As best shown in Fig. 2, the shaft 22 has therein a plurality of annular grooves 52, affording a plurality of intervening annular shoulders 54 which thus serve to establish the axial spacing of the several keys along the shaft. If desired, the annular shoulders could be provided by washers. In assembly, each key slot is positioned so that its enlarged upper end slips over the associated shoulder until the key attains its axial position, after which it is shifted upwardly to its operating position. As will be brought out below, each key is capable of being depressed from an outer idle position to an inward operative position, but the range of movement (Fig. 9) is such that the enlarged portion of the slot 50 does not again register with the shaft. Hence, there is no possibility of the key becoming inadvertently disconnected from the shaft.

Each key is biased to its outward position by biasing means, here in the form of a torsion spring 56 having a loop 58 and a pair of legs 60 and 62. This is best shown in Fig. 9, wherein it also appears that the free end of the leg 60 is hooked at 64 over the shaft 22 via the associated groove 52 so as to effect a pivotal connection. The free end of the leg (Fig. 10) is offset at 66 and is inserted through an aperture 68 in the key. When the spring 56 is in its operative position, and the associated key 28 is in its out or idle position, as in the case of the number 3 key in Fig. 3, the biasing force in the spring 56 is such as to urge the legs 60 and 62 apart, whereby the leg 62 urges the key upwardly. When the key is depressed (Fig. 9) the pivotal connection of the leg 60 to the shaft 22 at 64—52, plus the motion of the key, enables the spring to turn to a position such that the loop 58 moves above the shaft 22, whereby the biasing force between the legs 60 and 62 is fore-and-aft, which therefore cancels the upward biasing force and changes it to a fore-and-aft biasing force. This prevents return of the number 3 key to its upward position, leaving that key down to serve as an indication that the transmission is operating in third speed. At the same time, the new biasing force (Fig. 9) acts to increase the friction between the shaft 22 and the key 28 via the slot and prevents inadvertent return of the key, as due to vibration of the vehicle.

The foregoing has established that the keys are individually depressible along their respective straight-line paths, each of which is a radius of the shaft 22. There are as many springs 56 as there are keys and therefore each key is individually biased to return to its outward idle position, subject of course to the change of the biasing means when the key is depressed, which has been explained above and which is apparent from a comparison of the number 3 key in Fig. 3 with the same key in Fig. 9.

It remains only to describe the selectors further and to explain how they are rocked fore-and-aft in response to selective depression of the keys.

The speed selector is provided with a plurality of fore-and-aft slots 70, all shown here as being identical. As will be clear, each slot 70 has a fore-and-aft or circumferential dimension substantially greater than a reduced portion 72 of the associated key 28. Each key has above the reduced portion 72 a cam portion or cam means 74 which has a fore-and-aft dimension slightly larger than that of the associated slot 70, and this cam portion is centered on the radial path or path of movement of the key and has front and rear edges 76 and 78, respectively, which converge symmetrically inwardly to the associated reduced portion 72. When the keys are in their outer or idle positions, the reduced portions 72 thereof are loosely received in the respective slots 70. This is also true of the relationship between the keys and slots 80 in the range selector.

In assembled relation, the two selectors are arranged with the speed selector uppermost, so that the slots 70 therein are in lateral but not necessarily fore-and-aft register with the slots 80 in the range selector. The slots 70 and 80 are preferably of equal angular extent and, as best shown in Figs. 3, 6 and 9, the front and rear edge portions thereof are turned down for reinforcement and ease of operation. This is a detail that requires no elaboration.

The principle of operation is based on centering of the selector slots with a selected depressed key. For example, in Fig. 9, the number 3 key has been depressed so that the cam portion 74 centers in the associated selector slots 70 and 80. If these selectors start in positions in which the fore-and-aft register of the slots with the cam portion 74 of the key is destroyed, then centering as shown in Fig. 9 will reestablish the fore-and-aft register and accordingly will move the selectors in amounts and directions necessary to enable achievement of this register.

As shown in Figs. 4 and 5, the slots 70 and 80 are in various stages of register and non-register with the respective keys. For example, keys 1, 2 and N are centered in their repsective slots in the speed selector and in Fig. 5 keys P and N are centered in their respective slots 80 in the range selector. The fact that the number 2 and number 5 keys are centered in their respective slots 70 indicates that the transmission is in either second or fifth speed, the ultimate choice of which is determined by the position of the range selector. As shown, the position of the range selector is such that it is in neutral, since the N key is in the center of its slot. Accordingly, the transmission has preselected a speed based on the 2-5 ratio in the transmission, but it remains for movement of the range selector to either high, low or reverse to complete the power train.

Figs. 6, 7 and 8 show the control mechanism actuated to produce third speed forward. Hence, Fig. 6 shows that the number 3 key has been depressed, so that the cam portion centers in the associated slot 70 in the speed selector, causing the speed selector to move from its position of Fig. 4 to that of Fig. 7. Note the difference in the positions of the arrows from the connections 42.

The number 3 key in Fig. 8 is centered in its slot 80 in the range selector, thus correcting the out-of-register condition existing in Fig. 5, which results in movement of the selector rearwardly from the position of Fig. 5 (N) to that of Fig. 8 (Hi). Consequently, both range and speed selectors have been moved rearwardly, in this case a single increment to change the transmission from a neutral status in which the speed selector was in the 2-5 position to an operative status in which the speed selector is in the 1-3 position and the range selector is in the high position, thus establishing third speed forward.

As previously indicated, the effect on the biasing means or spring 56 when the particular key is depressed is such as to negative the effect of the biasing means to immediately return the depressed key to its outward or idle position. This is desirable, inasmuch as the depressed key serves as an indication of the operating speed of the transmission. However, when another key is depressed to bring about register between the cam portion of the depressed key and the associated slots in the speed and range selector, the natural result is an out-of-register condition as respects the depressed key and its slots. Because of the front and rear downwardly converging cam edges 76 and 78, which operate as ramps, movement of the selectors by another key automatically incurs upward movement of the depressed key, at least sufficient to enable restoration of the biasing means or spring 56 to a condition in which it can complete the upward movement of the depressed key to its upper or idle position. Hence, each key is not only capable of moving both the speed and range selectors simultaneously, and possibly different amounts and possibly different directions, but it also automatically incurs upward return of whatever other key happens to be depressed previously. This is true of all keys and the unit is completely selective.

The selection of other speeds will be readily apparent from what has been described above. For example, to effect a return of the transmission to neutral from the condition shown in Figs. 6, 7 and 8, the neutral key is depressed. As shown in Figs. 7 and 8, the N key is forwardly offset from a centered position in the neutral slot in each case. Consequently, when the key is depressed, it will tend to establish centering or registering of the end key cam portion with the associated slot, which in this case moves the speed and range selectors forwardly. However, forward movement of the range selector from Hi to N is the only change that is significant, and it is immaterial that the speed selector is also moved in the change to neutral. Another example will be recognized in the selection of third speed in reverse, which is established by depression of the number 3R key. As seen in Fig. 7, the key is materially forwardly offset from the center of the associated slot 70 in the speed selector. Hence, it will move the speed selector forwardly through two increments to the 4–7 position. At the same time, as the centering or exact register is brought about in the range selector, the range selector will move rearwardly to the R position. The foregoing are believed to be sufficient examples of the operation and versatility of the control mechanism.

As already indicated, the arrangement is such that the unit is compact, composed of relatively few parts, many of which are identical, and may be readily assembled and serviced. It is positive-acting in both directions. That is to say, the cams 74 on the keys are ramped in both directions so that the selectors are positively moved and do not depend on springs for movement in one direction or the other.

Features not categorically enumerated will readily occur to those versed in the art, as will variations in the preferred embodiment illustrated, all of which may be achieved without departure from the spirit and scope of the invention.

What is claimed is:

1. Control mechanism of the class described, comprising: a support including a transverse shaft and an arcuate fore-and-aft panel concentric with and outwardly of said shaft, said panel having a plurality of laterally spaced apart guide apertures respectively in radial register with the shaft; a plurality of keys spaced apart axially of the shaft and extending outwardly respectively through the guide apertures; means combining with each guide aperture for mounting the associated key for movement from an outward idle position to an inward operative position and along a straight line path lying along a radius from the shaft to the guide aperture, said means including in each key a shaft-receiving slot lying along the respective path; each key having thereon between the shaft and panel a cam portion of relatively wide fore-and-aft dimension and including front and rear edges converging symmetrically radially inwardly to a reduced-width key portion outwardly of the shaft; means biasing the keys individually to their respective idle positions; a selector carried coaxially with the shaft for fore-and-aft angular movement and having an arcuate part concentric with the shaft and radially inwardly of the cam portions of the idly-positioned keys; and said selector part having therein a plurality of fore-and-aft slots through which the keys respectively extend, each selector slot having a fore-and-aft extent greater than the reduced-width portion of the associated key but less than the fore-and-aft dimension of the cam portion of said key, said selector slots being respectively out of fore-and-aft register with the cam portions of the idle positioned keys so that movement of a key to its operative position acts via centering of its cam portion in the respective selector slot to move the selector angularly, and the out-of-register conditions among the selector slots and cam portions existing in different degrees so that the keys are capacitated to move the selector angularly in different amounts and directions.

2. The invention defined in claim 1, in which: the shaft has therein a plurality of axially spaced apart annular grooves respectively receiving the key slots to fix the axial spacing of the keys along the shaft.

3. The invention defined in claim 1, in which: each biasing means comprises a torsion spring having a loop offset fore-and-aft from the respective key, a first leg extending from the loop and pivotally engaging the shaft and a second leg extending from the loop and engaging the key in radially spaced relation to the shaft, the bias in the loop acting to spread the legs so as to urge the key outwardly and the pivotal engagement of the second leg with the shaft enabling the spring to turn bodily about the shaft axis as the key is moved inwardly so that the loop assumes a position above the shaft and thereby loses its outward bias on the key.

4. The invention defined in claim 1, including: a second selector coaxial with and angularly movable relative to the first named selector and having an arcuate part closely concentric with the arcuate part of said first named selector, said second selector part having fore-and-aft slots similar to the first named selector slots and similarly related to the keys whereby said second selector is also movable by the keys.

5. Control mechanism of the class described, comprising: a support including a transverse shaft; a plurality of keys spaced apart axially of the shaft and extending radially therefrom; means for mounting the keys for individual movement from an outward idle position to an inward operative position and along a straight line path lying along a radius from the shaft; each key having thereon outwardly of the shaft a cam portion of relatively wide fore-and-aft dimension and including front and rear edges converging symmetrically radially inwardly to a reduced-width key portion outwardly of the shaft; means biasing the keys individually to their respective idle positions; a selector carried coaxially with the shaft for fore-and-aft angular movement and having an arcuate part concentric with the shaft and radially inwardly of the cam portions of the idly-positioned keys; and said selector part having therein a plurality of fore-and-aft slots through which the keys respectively extend, each selector slot having a fore-and-aft extent greater than the reduced-width portion of the associated key but less than the fore-and-aft dimension of the cam portion of said key, said selector slots being respectively out of fore-and-aft register with the cam portions of the idle positioned keys so that movement of a key to its operative position acts via centering of its cam portion in the respective selector slot to move the selector angularly, and the out-of-register conditions among the selector slots and cam portions existing in different degrees so that the keys are capacitated to move the selector angularly in different amounts and directions.

6. The invention defined in claim 5, in which: each biasing means comprises a torsion spring having a loop offset fore-and-aft from the respective key, a first leg extending from the loop and pivotally engaging the shaft and a second leg extending from the loop and engaging the key in radially spaced relation to the shaft, the bias in the loop acting to spread the legs so as to urge the key outwardly and the pivotal engagement of the second leg with the shaft enabling the spring to turn bodily about the shaft axis as the key is moved inwardly so that the loop assumes a position above the shaft and thereby loses its outward bias on the key.

7. The invention defined in claim 5, including: a second selector coaxial with and angularly movable relative to the first-named selector and having an arcuate part closely concentric with the arcuate part of said first-named selector, said second selector part having fore-and-aft slots similar to the first-named selector slots and similarly related to the keys whereby said second selector is also movable by the keys.

8. The invention defined in claim 5, in which: each biasing means comprises a spring connected between the shaft and the respective key to exert force along a line biasing the key outwardly, said spring being mounted for bodily shifting when the key is moved inwardly so as to exert a force along a line transverse to the first line so as to lose its outward bias on the key.

9. Control mechanism of the class described, comprising: a support; a fore-and-aft movable first selector carried by the support and having therein a plurality of fore-and-aft slots; a plurality of keys extending respectively through the slots and carried by the support for individual movement respectively along separate straight-line paths generally normal to the selector, each key having a slot-received portion of reduced fore-and-aft dimension as respects the associated slot and a cam portion spaced along its path from the associated slot and having a fore-and-aft dimension greater than that of said slot, said cam portion including front and rear edges converging to the reduced key portion symmetrically as respects its path; certain of said slots being respectively initially out of fore-and-aft register with the cam portions of the associated keys and the out-of-register conditions varying as to amount and direction so that selective movement of each key individually along its path incurs registration of its cam portion and the respective slot and moves the selector fore-or-aft accordingly; and a second selector generally paralleling the first selector and carried by the support for fore-and-aft movement relative to said first selector and having fore-and-aft slots respectively receiving the keys and related to the cam portions on the keys similarly to that of the first selector whereby the second selector is also movable by the keys as aforesaid.

10. Control mechanism of the class described, comprising: a support; a fore-and-aft movable first selector carried by the support and having therein a plurality of fore-and-aft slots; a plurality of keys extending respectively through the slots and carried by the support for individual movement respectively along separate straight-line paths generally normal to the selector, each key having a slot-received portion of reduced fore-and-aft dimension as respects the associated slot and a cam portion spaced along its path from the associated slot and having a fore-and-aft dimension greater than that of said reduced portion, said cam portion including an edge tapering to said reduced portion to afford a ramp on said key; certain of said slots being respectively out of register with the ramps and the out-of-register conditions varying as to amount and direction so that selective movement of each key individually along its path incurs registration of its ramp and the respective slot and moves the selector fore-or-aft accordingly; and a second selector generally paralleling the first selector and carried by the support for fore-and-aft movement relative to said first selector and having fore-and-aft slots respectively receiving the keys and related to the ramps on the keys similarly to that of the first named selector whereby the second selector is also movable by the keys as aforesaid.

11. Control mechanism of the class described, comprising: a support member; a key element mounted for movement in opposite directions toward and away from the member along a path normal to the member; and a torsion spring biasing the key in one direction and including a loop offset from said path, a first leg extending from the loop and pivotally engaging the member and a second leg extending from the loop and engaging the element in spaced relation to the member along said path so that the bias in the loop acts to spread the legs so as to urge the element in said one direction and the pivotal engagement of the second leg with the member enabling the spring to turn bodily about the member as the element is moved in the opposite direction so that the loop assumes a position angularly spaced from its aforesaid offset position whereby the bias in the loop tends to spread the legs transversely to said path.

References Cited in the file of this patent

UNITED STATES PATENTS

| | | |
|---|---|---|
| 1,760,710 | Mitchell | May 27, 1930 |
| 2,557,480 | Snyder | June 19, 1951 |